United States Patent
Suzuki et al.

[11] Patent Number: 6,016,223
[45] Date of Patent: *Jan. 18, 2000

[54] DOUBLE BESSEL BEAM PRODUCING METHOD AND APPARATUS

[75] Inventors: Masayuki Suzuki, Hadano; Shigeyuki Suda, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/755,357

[22] Filed: Nov. 25, 1996

Related U.S. Application Data

[63] Continuation of application No. 08/111,867, Aug. 26, 1993, abandoned.

[30] Foreign Application Priority Data

Aug. 31, 1992 [JP] Japan ................................. 4-255471

[51] Int. Cl.[7] .................................................. G02B 27/00
[52] U.S. Cl. .......................... 359/577; 359/900; 359/558
[58] Field of Search .................... 359/557, 565, 359/583, 558, 559, 562, 577, 724, 387, 640, 900; 372/9, 32; 219/121.61

[56] References Cited

U.S. PATENT DOCUMENTS

| | | | |
|---|---|---|---|
| 4,275,288 | 6/1981 | Makosch et al. | 219/121 |
| 4,498,184 | 2/1985 | O'Meara | 372/92 |
| 4,887,885 | 12/1989 | Durnin et al. | 359/559 |
| 5,042,928 | 8/1991 | Richards | 359/724 |
| 5,111,312 | 5/1992 | Stewart | 359/562 |
| 5,223,693 | 6/1993 | Zumoto et al. | 219/121.68 |
| 5,245,619 | 9/1993 | Kronberg | 372/32 |
| 5,278,679 | 1/1994 | Davis et al. | 359/565 |
| 5,300,756 | 4/1994 | Cordingley | 359/559 |
| 5,336,875 | 8/1994 | Ono et al. | 235/467 |
| 5,477,554 | 12/1995 | Yoshii et al. | 372/9 |

OTHER PUBLICATIONS

I.J. Cox, et al., "Reappraisal of Arrays of Concentric Annuli as Super Resolving Filters", J. Opt. Soc. Am., vol. 72, No. 9, Sep. 1982, pp. 1287–1291.

J.H. McCleod, "The Axicon: A New Type of Optical Element", J. Opt. Soc. Am., vol. 44, No. 8, Aug. 1954, pp. 592–597.

Kawata, S. and Arimoto, R., "Long–range laser–beam spot formation by an by an axicon prism," The Japan Society of Applied Physics and Related Societies, 30p–A–4, p. 829 (1991), with English translation. (no month available).

Durnin, J., Exact Solutions for Nondiffracting Beams. I. The Scalar Theory, Journal of the Optical Society of America A, Optics and Image Science, Apr., 1987, vol. 4, No. 4, pp. 651–654.

Durnin, J., & Miceli, Jr., J., Diffraction–Free Beams, Physical Review Letters, Apr. 13, 1987, vol. 58, No. 15, pp. 1499–1501.

*Primary Examiner*—Cassandra Spyrou
*Assistant Examiner*—John Juba, Jr.
*Attorney, Agent, or Firm*—Fitzpatrick, Cella, Harper & Scinto

[57] ABSTRACT

A double Bessel beam is produced such that two Bessel beams are superimposed on each other with respect to amplitude so as to interfere with each other. Each of the Bessel beams has a shape of the zero-order bessel function of the first kind and a light amplitude distribution different in diameter from that of the other. An apparatus for producing a double Bessel beam includes a device for producing two Bessel beams each having a shape of the zero-order Bessel function of the first kind and a light amplitude distribution different in diameter from the other, and a device for superimposing the two Bessel beams on each other with respect to amplitude so as to interfere with each other.

6 Claims, 14 Drawing Sheets

Z = 0

Z = 0.1mm

Z = 0.2mm

Z = 0.3mm

Z = 0.5mm

Z = 0.7mm

DOUBLE BESSEL BEAM PRODUCING METHOD AND APPARATUS

This application is a continuation of application Ser. No. 08/11,867, filed Aug. 26, 1993, now abandoned.

BACKGROUND OF THE INVENTION

1. Field of the Invention

The present invention relates to a method for producing a laser beam in micro spot and with deep depth of focus, and to an apparatus using the method.

2. Related Background Art

Conventional laser beams were generally Gaussian beams, which had restrictions based on propagation properties thereof. Recently, Bessel beams ($J_0$ beams or nondiffracting beams) attract attention as laser beam having a very deep depth of focus and a relatively small diameter of spot. The details about Bessel beam are described for example in Durnin: J. Opt. Soc. Am. A, vol. 4, No. 4, p. 651 (1987). The Bessel beams have a feature that the light amplitude distribution is proportional to the zero-order Bessel function of the first kind in the cross section normal to the propagation direction. In detail, the amplitude distribution U(r) of Bessel beam may be expressed by the following equation with r being a distance to the optical axis.

$$U(r) = AJ_0(\alpha r) \quad (1)$$

In the above equation A and $\alpha$ are constants.

There are known methods for approximately obtaining a Bessel beam, for example, a method for forming a Bessel beam by using narrow ring apertures and a lens, which was proposed by Durnin et al. (Phys. Rev. Letters, vol. 58, No. 15, p. 1499 (1987)), and a method for forming a Bessel beam by using a conical prism, which was proposed by Kawada and Arimoto (Extended Abstracts p. 829, 30p-A-4 (Spring Meeting, 1991); The Japan Society of Applied Physics and Related Societies).

As apparent from the behavior of $J_0(r)$, the Bessel beams, however, have difficulty in applications in that the intensity of side lobes of diffraction rings is high. For example, as shown in FIGS. 7A through 7C described below, the intensity of first ring is 16% of that of center peak and the intensity of second ring is 9% thereof. The existence of such submaxima (side lobes) made it difficult for Bessel beams to be applied in actual apparatus, for example in recording apparatus.

SUMMARY OF THE INVENTION

It is an object of the present invention to provide a laser beam having suppressed submaxima while keeping the properties of small spot diameter and deep depth of focus, which are the properties of the conventional Bessel beams, and being suitable for applications in actual optical apparatus, and to provide an optical apparatus using the laser beam.

The present invention is featured in that two Bessel beams mutually different in ring diameter or in position of submaxima are superimposed on each other with respect to amplitude to interfere with each other, whereby a beam amplitude distribution obtained has a shape having suppressed submaxima while keeping the characteristics of the original Bessel beams as a whole. In this specification, the beam obtained by the interference of two Bessel beams will be called a double Bessel beam.

The suppressed submaxima cause the double Bessel beam amplitude distribution to have a shape closer to Gaussian beams than the conventional Bessel beams. This enables an optical system to have a deep depth of focus while keeping the properties of Bessel beams having a deep depth of focus, which makes applications in wide area possible.

DESCRIPTION OF THE PREFERRED EMBODIMENTS

Figure 1A:
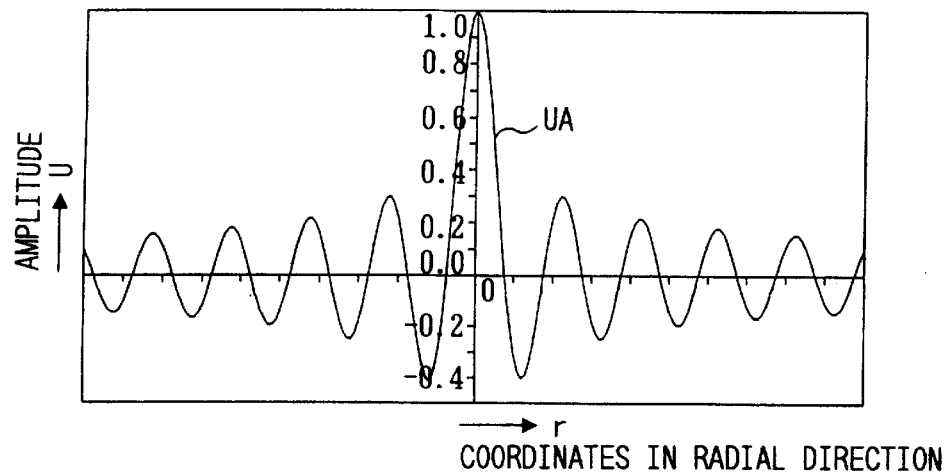
FIGS. 1A to 1C are drawings to illustrate the conception of the present invention.
Figure 1B:
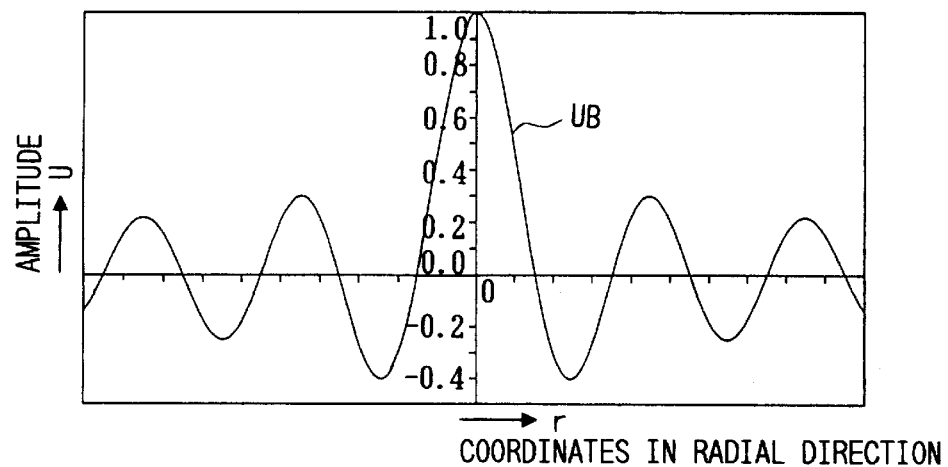
Figure 1C:
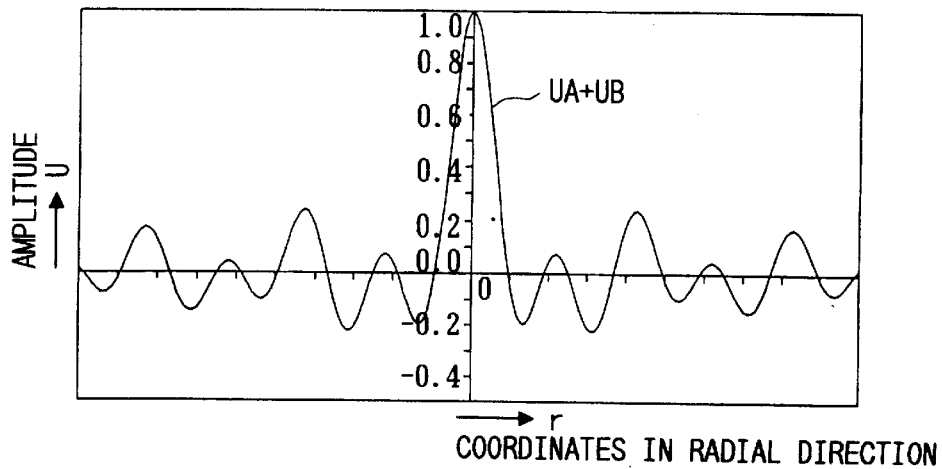

FIGS. 1A to 1C are drawings to show the conception of the present invention. FIG. 1A shows the amplitude UA of a first Bessel beam, FIG. 1B shows the amplitude UB of a second Bessel beam, and FIG. 1C shows the amplitude UA+UB of a (double Bessel) beam formed by superimposing the amplitudes of the above two Bessel beams. In the drawings, r represents the radial coordinate and U the amplitude. The coordinate r is drawn in the same scale in the drawings, and the amplitude is normalized as the value of beam center is 1.

The Bessel beam UA shown in FIG. 1A is same as the Bessel beam UB shown in FIG. 1B in the sense that they are Bessel beams having the shape of the zero-order Bessel function of the first kind, but they are different from each other in diameter. In detail, the Bessel beam UB has the amplitude distribution obtained by spatially enlarging (proportionally magnifying) the Bessel beam UA. Accordingly, the beam UB has a larger size of beam spot and longer pitches of diffraction rings than the beam UA.

When the two beams UA and UB are superimposed on each other to interfere with each other (when they are added to each other), the beam UA+UB has the amplitude distribution shown in FIG. 1C. It is seen in the amplitude distribution of UA+UB that peaks and valleys of UA and UB cancel each other so that the amplitudes of diffraction rings (side lobes) become smaller than those of UA and UB. As discussed, the double Bessel beam may have suppressed diffraction rings (side lobes) by the superposition of two Bessel beams for mutual interference, and the two Bessel beams preferably have the parameter ε, which is a ratio of beam diameters thereof, between 0.3 and 0.7 in order to construct an optical system having a deep depth of focus.

Figure 2:
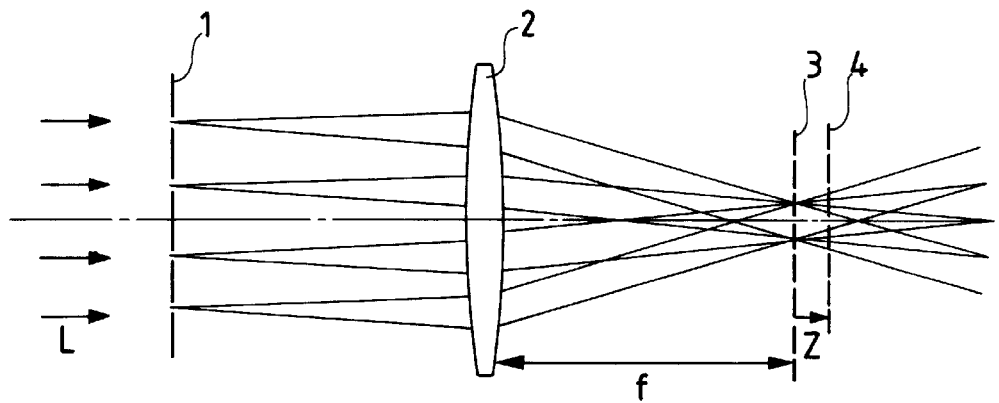
FIG. 2 is a drawing to show an optical system using a double ring aperture in the first embodiment to produce a double Bessel beam according to the present invention.

FIG. 2 shows the first embodiment of the optical system for forming a double Bessel beam introduced by the present invention. FIG. 2 is an equivalent diagram to show a fundamental construction for forming a double Bessel beam. First described with FIG. 2 are basic parameters for double Bessel beam of the present invention, clarifying the conditions for obtaining a suitable double Bessel beam.

Figure 3A:
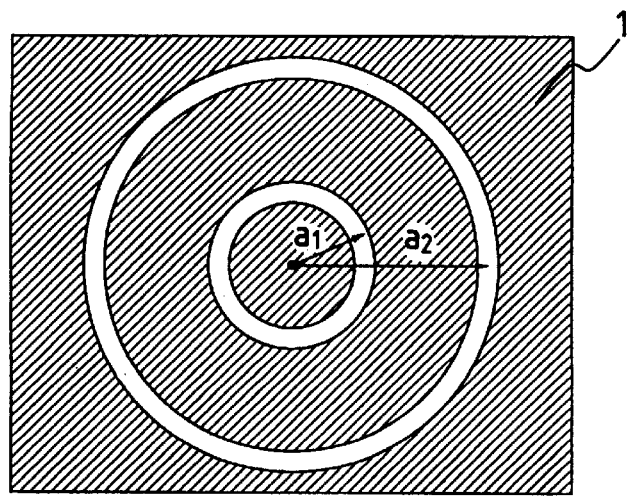
FIGS. 3A and 3B are drawings to show double aperture rings in the first embodiment of the present invention.
Figure 3B:
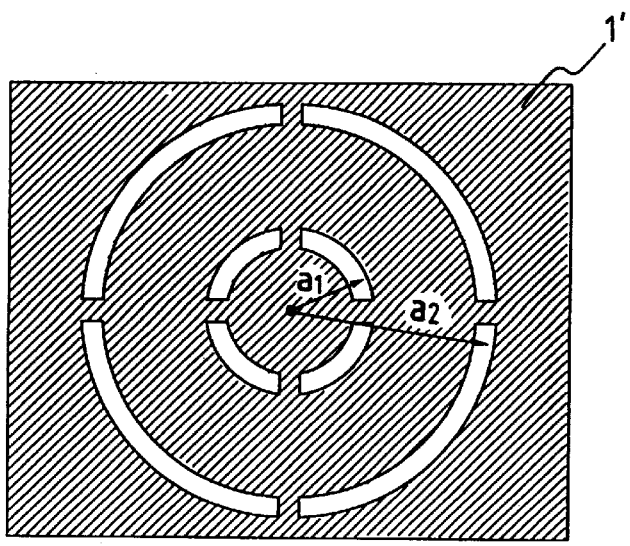

In FIG. 2, reference numeral 1 denotes a concentric double ring aperture, 2 a lens, 3 an image side focal plane of lens 2, and 4 an observation surface provided at a position defocused by z from the focal plane 3. The rotation symmetry axis of concentric ring aperture 1 is arranged as to coincide with the optical axis of lens 2. FIGS. 3A and 3B show the appearance of the ring aperture 1 as seen along the rotation symmetry axis. As shown in FIG. 3A, the ring aperture is basically constituted by two narrow ring portions. In the drawings, a hatched portion represents a light shield portion, an inner transmission aperture ring has a radius $a_1$, and an outer transmission aperture ring has a radius $a_2$. As apparent from the drawings, $$a_2 > a_1 > 0 \quad (2).$$

A width of each ring is assumed as sufficiently small.

The concentric double ring aperture 1 shown in FIG. 3A may be formed for example on a glass substrate ground by the precise surface grinding. The light shield may be readily achieved in conventional procedure, for example by coating the portion except for the opening portions with light absorbing material or by vapor deposition of light-reflective material.

Instead of using the glass substrate, the ring aperture can be cheaply produced as a rapping aperture. In this case, the openings cannot be perfect rings in order to hold the shielding portions, so that the ring aperture becomes an approximate double ring aperture with destroyed rotation symmetry as shown in FIG. 3B. FIG. 3B shows this aperture as 1'. There is no practical inconvenience when the aperture 1' is used in place of the aperture 1.

Next described are the operation of the optical system and the parameter dependency of the double Bessel beam of the present invention. In FIG. 2, the collimated laser beam L illuminates the concentric double ring aperture 1. Laser light outgoing from the aperture 1 forms two ring light beams to pass through the lens 2 and be superimposed on each other on the image side focal plane of lens 2. The two ring beams become Bessel beams mutually different in spot diameter and in amplitude distribution on the focal plane, which are coherent to form a double Bessel beam by mutual interference.

The amplitude distribution of this double Bessel beam formed on the image side focal plane 3 may be obtained by calculating the Fraunhofer diffraction of the concentric double ring aperture 1. As well known for a rotation symmetry system, the amplitude U(w) of light diffracted in the direction where the sine of an angle to the optical axis becomes equal to w is given by the following equation:

$$U(w) = 2\pi \int_0^\infty G(\rho) J_0(k\rho w) \rho \, d\rho \quad (3)$$

where ρ is a distance to the optical axis or center axis on the surface of aperture, G(ρ) is a pupil function expressing the amplitude distribution of aperture, and k(=2 π/λ: λ is a wavelength) is a wave number. Assuming an ideal case that the ring width of the aperture is infinitesimal, the pupil function G(ρ) is as follows.

$$G(\rho) = \delta(\rho - a_1) + \delta(\rho - a_2) \quad (4)$$

Substituting Equation (4) into Equation (3), the amplitude U(w) of a double Bessel beam formed at infinity may be calculated as follows.

$$U(w) = 2\pi [a_1 J_0(k a_1 w) + a_2 J_0(k a_2 w)] \quad (5).$$

The amplitude distribution on the focal plane of lens 3 is similar to that of the double Bessel beam at infinity. In other words, with the focal length of the lens being f and the distance to the optical axis on the focal plane being r as above, Equation (5) may be rewritten as follows using w=r/f.

$$U(r) = 2\pi [a_1 J_0(k a_1 r) + a_2 J_0(k a_2 r/f)] \quad (6)$$

To clarify the conditions for formation of a double Bessel beam of the present invention, a ratio ε of ring diameters is introduced as a new parameter, and an F-number of the system is defined as follows by the effective diameter of the outer ring.

$$\epsilon = a_1/a_2 \quad (7)$$

$$F = f/(2a_2) \quad (8)$$

Substituting ε and F into Equation (6) and omitting the irrelevant proportionality factor, the amplitude distribution U(r) and the intensity distribution I(r) on the focal plane of lens 3 are finally expressed as follows.

$$U(r) = \epsilon J_0(\epsilon \pi r/\lambda F) + J_0(\pi r/\lambda F) \quad (9)$$

$$I(r) = |U(r)|^2 \quad (10)$$

Equations (5), (6) and (9) define the same distribution, which are merely different in parameters, and mean that the amplitude of a double Bessel beam is given by a sum of amplitudes of two Bessel beams mutually different in scale. The two Bessel beams influence each other in the form of the sum of amplitudes, so that the beam amplitude distribution shape B2 may be controlled, which was impossible with a single conventional Bessel beam. In other words, the beam shape may be changed by changing the ratio of diameters of two rings in the present invention. The parameter ε is the ratio of diameters of two rings in the case of FIG. 2, which is nothing but the ratio of diameters of two Bessel beams. The parameter ε is also used in the embodiments as will be described below, in which e may be considered as a ratio of beam diameters.

Now described is the effect specifically observed with the double Bessel beam while the wavelength λ and the F-number are fixed. The parameter is the ring diameter ratio ε, and FIG. 4 to FIG. 7 show a change of spot shape on the focal plane depending upon a change of ε. Given parameters are the wavelength of λ=632.8 nm of He—Ne laser and the F-number defined by above Equation (8) as set as F=10. In each figure, the horizontal axis provides a distance r in units of mm to the optical axis on the focal plane and the vertical axis shows the intensity distribution normalized so that the center peak is 1.

Figure 4A:
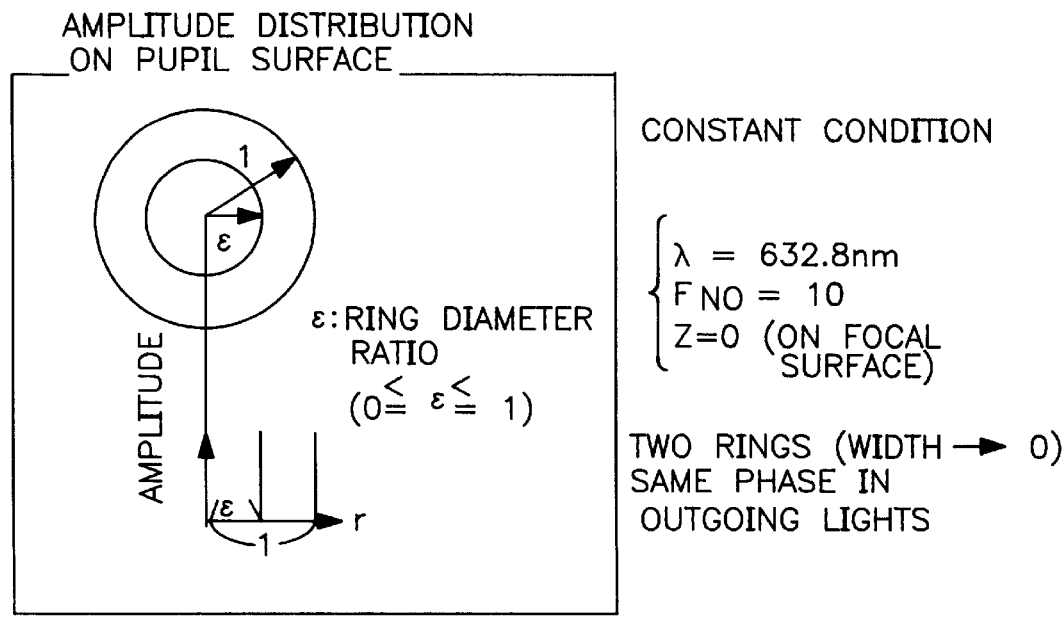
FIGS. 4A to 4C are drawings to show the parameter $\epsilon$ (0 to 0.1) dependency of a double Bessel beam.
Figure 4B:
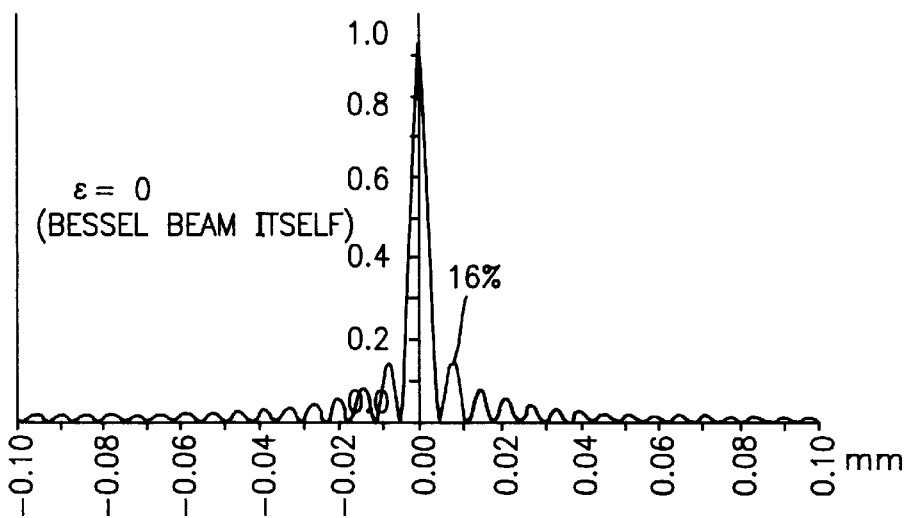
Figure 4C:
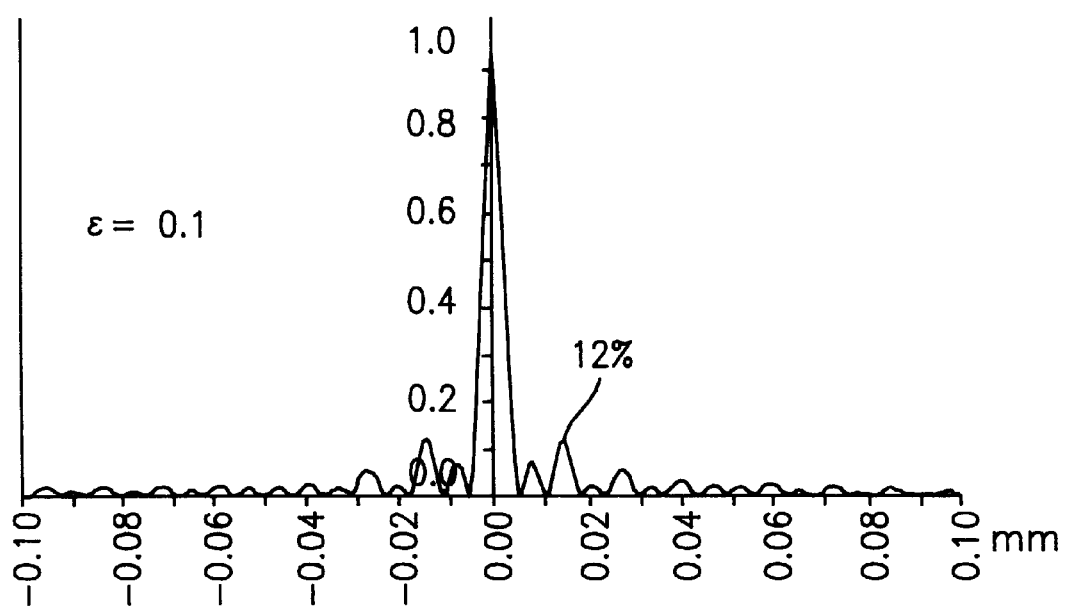
Figure 5A:
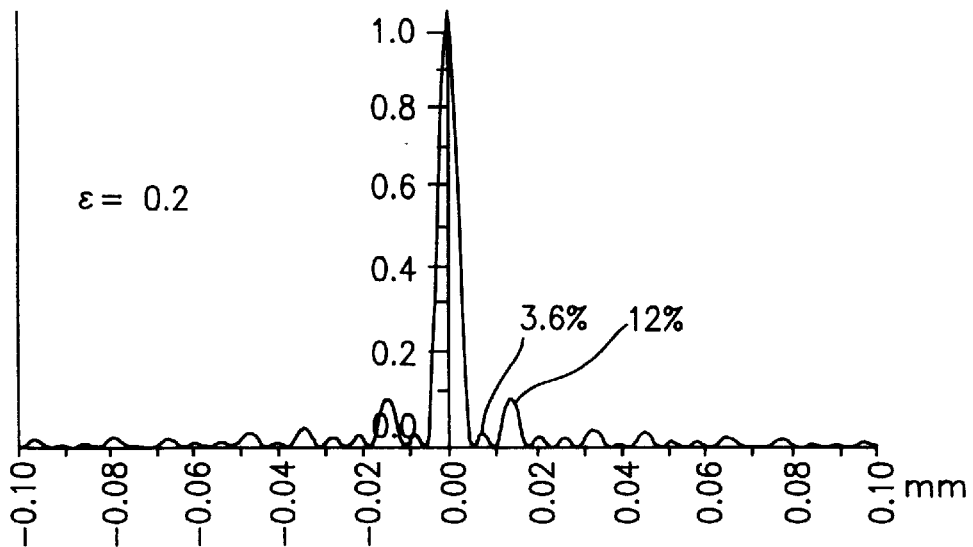
FIGS. 5A to 5C are drawings to show the parameter $\epsilon$ (0.2 to 0.4) dependency of a double Bessel beam.
Figure 5B:
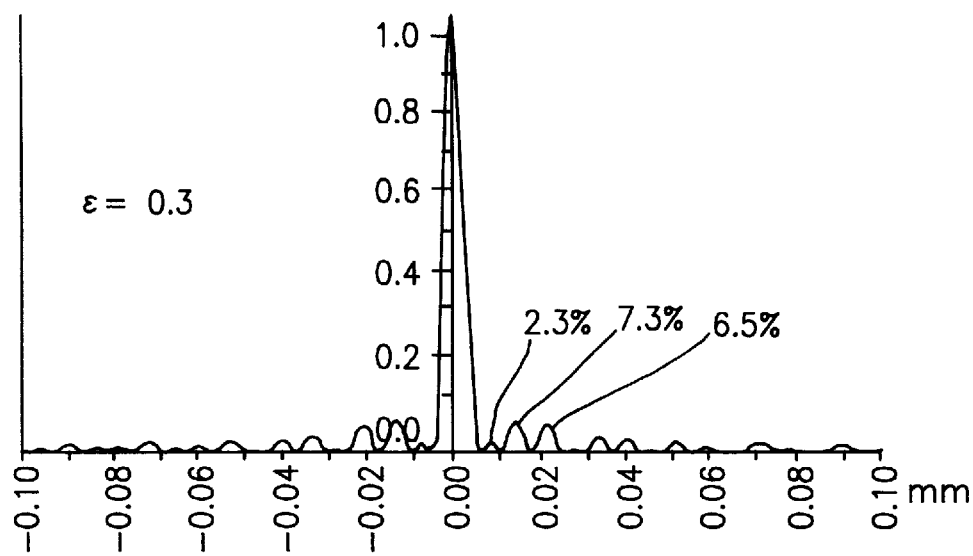
Figure 5C:
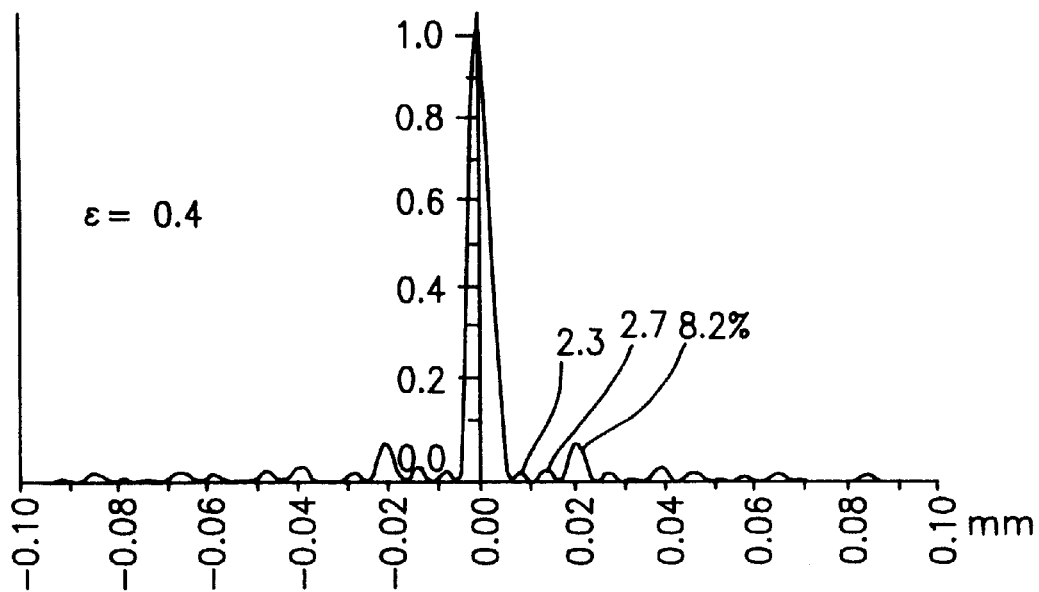
Figure 6A:
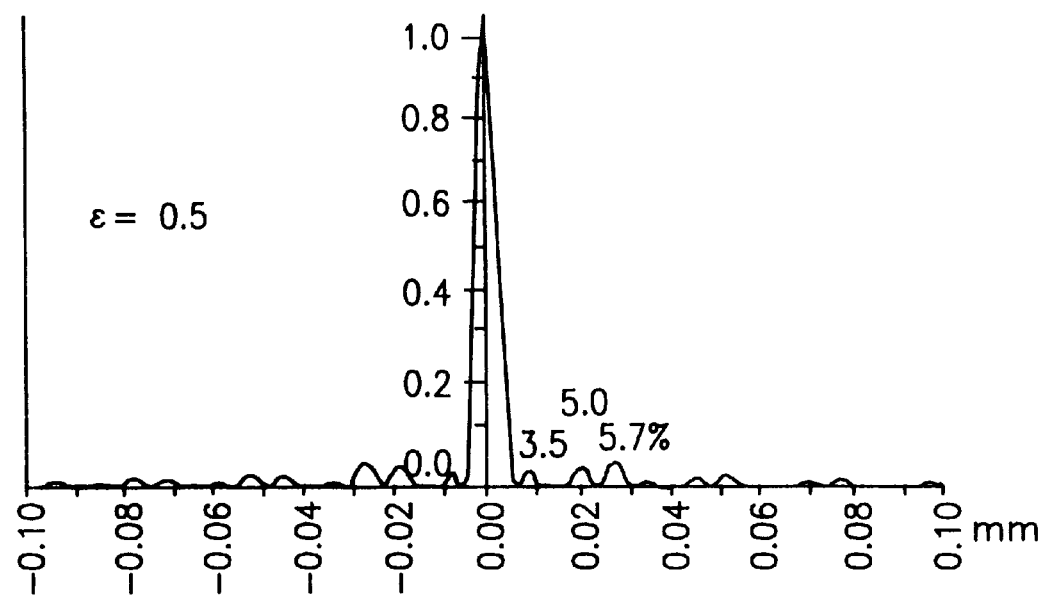
FIGS. 6A to 6C are drawings to show the parameter $\epsilon$ (0.5 to 0.7) dependency of a double Bessel beam.
Figure 6B:
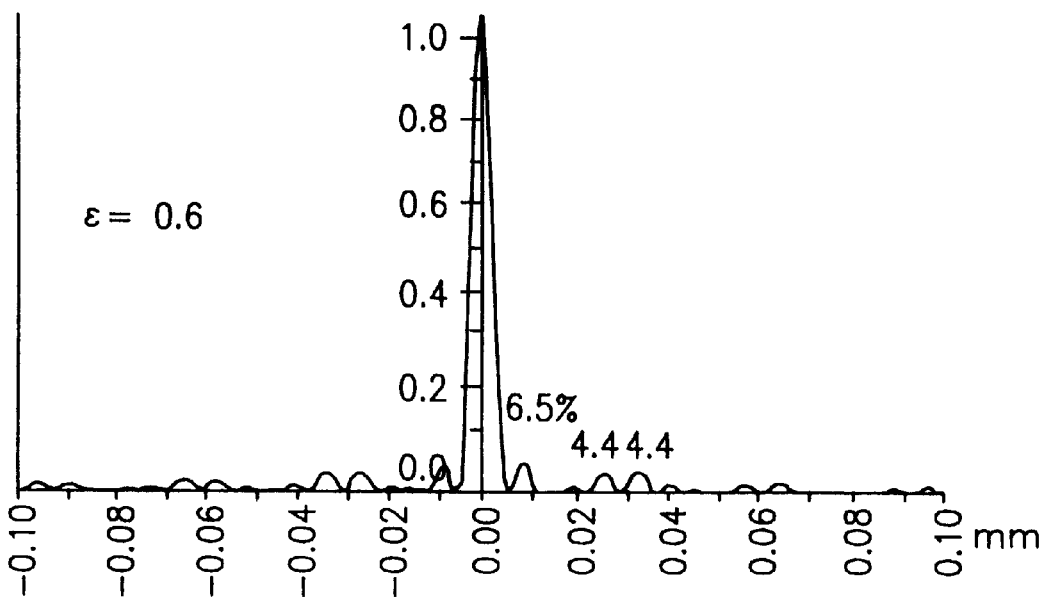
Figure 6C:
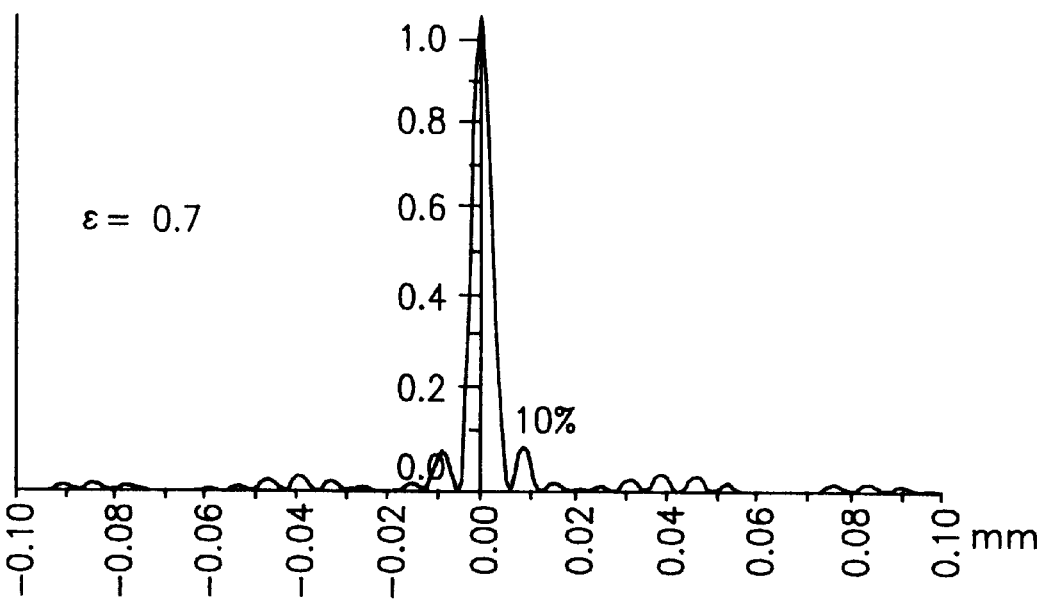
Figure 7A:
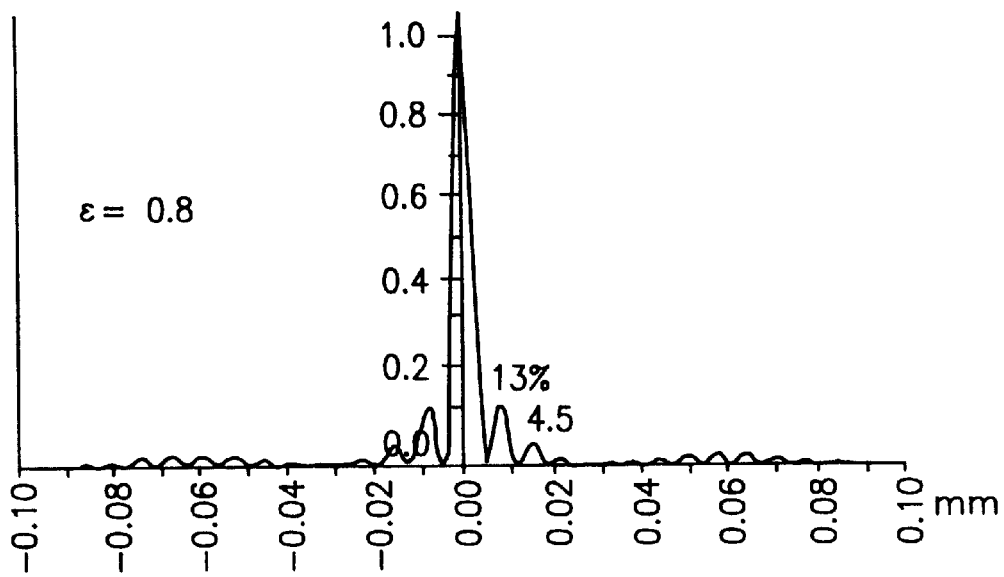
FIGS. 7A to 7C are drawings to show the parameter $\epsilon$ (0.8 to 1.0) dependency of a double Bessel beam.
Figure 7B:
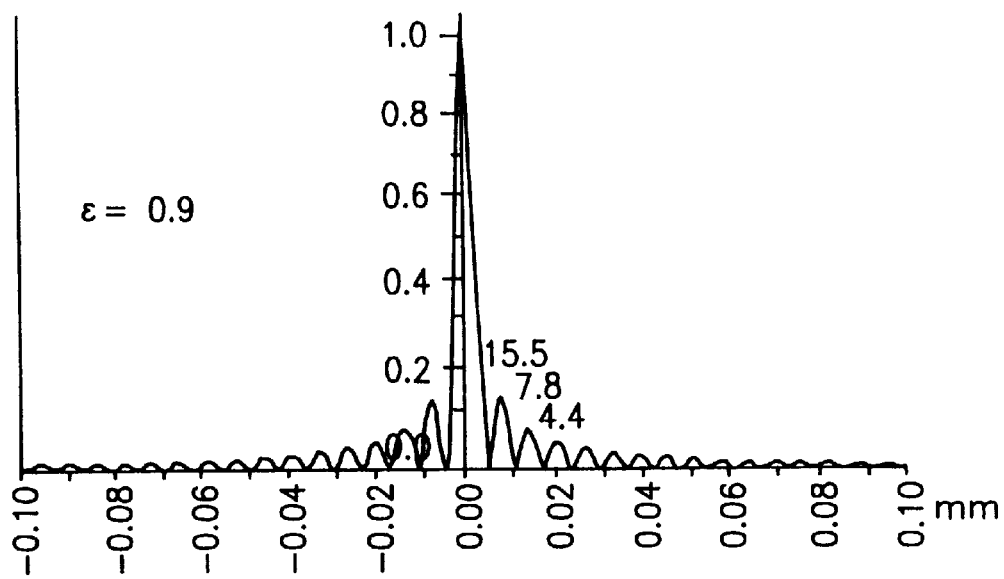
Figure 7C:
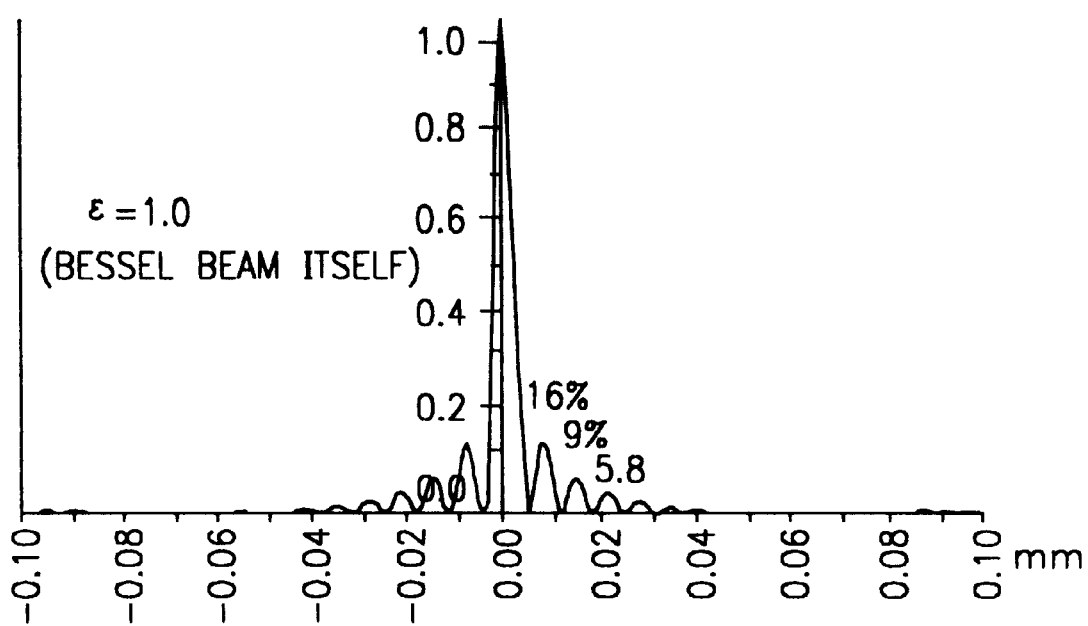

FIG. 4A to FIG. 7C show how the shape (intensity profile) of double Bessel beam amplitude distribution changes depending upon values of $\epsilon$. FIGS. 4A to 4C show $\epsilon$ of 0 and 0.1, FIGS. 5A to 5C show $\epsilon$ of 0.2 to 0.4, FIGS. 6A to 6C show $\epsilon$ of 0.5 to 0.7, and FIGS. 7A to 7C show $\epsilon$ of 0.8 to 1.0. The case of $\epsilon=0$ shown in FIG. 4B corresponds to a case with no inner ring, and therefore the intensity distribution is nothing but the conventional Bessel beam.

As described in the section of related background art, the intensity of first diffraction ring is about 16% of the center intensity. As the value of $\epsilon$ increases from 0.1 to 0.2, the intensity of first diffraction ring decreases but the intensity of second diffraction ring increases to exceed the first diffraction ring. However, the maximum intensity of the larger second diffraction ring is suppressed to 12% even with $\epsilon$ of 0.2, which is improved as compared with 16% in conventional Bessel beam.

The second ring starts decreasing at $\epsilon=0.3$ and 0.4, and the third ring becomes a diffraction ring showing a maximum intensity. In summary, the process of change with increase of $\epsilon$ shows a phenomenon that a diffraction ring showing a maximum intensity is shifted to a higher order step by step toward the outside. As shifted toward the outside, the intensity of a diffraction ring showing a maximum intensity decreases, so that the maximum intensity becomes decreased down to 7 to 8% of the central intensity.

At $\epsilon=0.5$ and 0.6 the maximum intensity of diffraction ring is most decreased. As the order of the maximum intensity continues being shifted toward the outside, the intensity of the first diffraction ring starts growing, whereby a balance is established among the diffraction rings so that peak values of submaxima become minimum as a whole. In this case, the maximum intensity of diffracted light is about 6%, which is about ⅓ of that in the conventional Bessel beam.

After $\epsilon=0.7$, the first-order diffraction ring further grows, and the influence thereof becomes dominant. The intensity of first-order ring is 10% at $\epsilon=0.7$, 13% at $\epsilon=0.8$, and 15% at $\epsilon=0.9$. At $\epsilon=1.0$ the inner ring becomes coincident with the outer ring, so that the obtained beam is nothing but the original Bessel beam and the maximum intensity of first-order ring returns to 16%.

The spot shape of double Bessel beam of the present invention changes as described above depending upon $\epsilon$. The decrease of diffraction rings, which was a desire to be achieved with the conventional Bessel beams, is most preferably accomplished when the ratio $\epsilon$ of radius between two rings is 0.5 to 0.6. Substantially, it is found that the ratio $\epsilon$ may be preferably within the following range.

$$0.3 \leq \epsilon \leq 0.7 \tag{11}$$

One of the features of Bessel beams is the deep depth of focus. Next described is how the original properties of Bessel beams change with improvement of beam shape by employing the double Bessel beam. The defocus property of a double Bessel beam can be obtained by calculating the Fresnel diffraction of amplitude distribution of Equation (9). From the result of Fresnel diffraction integral, omitting a term of total proportionality factor, the amplitude distribution $U(r, z)$ and the intensity distribution $I(r, z)$ where a defocus amount z is introduced may be expressed as follows.

$$U(r,z)=\epsilon \cdot \exp[ik(1-\epsilon^2)z/8F^2] \cdot J_0(\epsilon \pi r/\lambda F)+J_0(\pi r/\lambda F) \tag{12}$$

$$I(r,z)=|U(r, z)|^2 \tag{13}$$

In the equations, z is a coordinate in the direction of optical axis in the cylindrical coordinate system with the origin at the position of image side focal point of lens as shown in FIG. 2.

FIGS. 8A to 8C and FIGS. 9A to 9C show calculation results from Equations (12) and (13) with wavelength of $\lambda=632.8$ nm of He—Ne laser, with F-number, as defined by above Equation (8), of F=10, similarly as shown in FIGS. 4 to 7, and with ratio $\epsilon$, as defined by above Equation (7), of $\epsilon=0.5$, which is the optimum condition of beam amplitude distribution shape parameter.

Figure 8A:
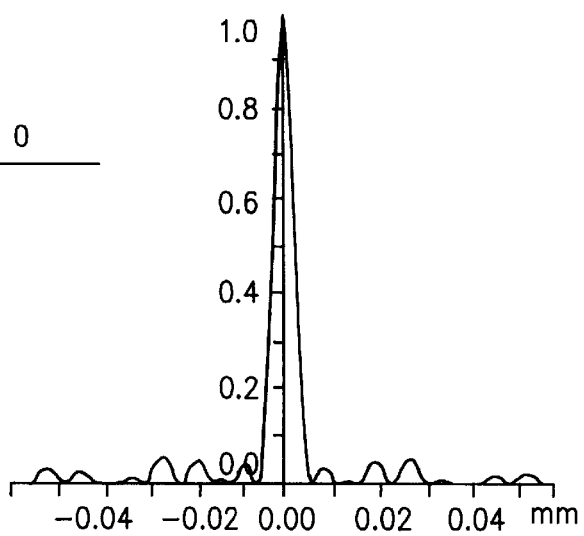
FIGS. 8A to 8C are drawings to show the defocus dependency of a double Bessel beam.
Figure 8B:
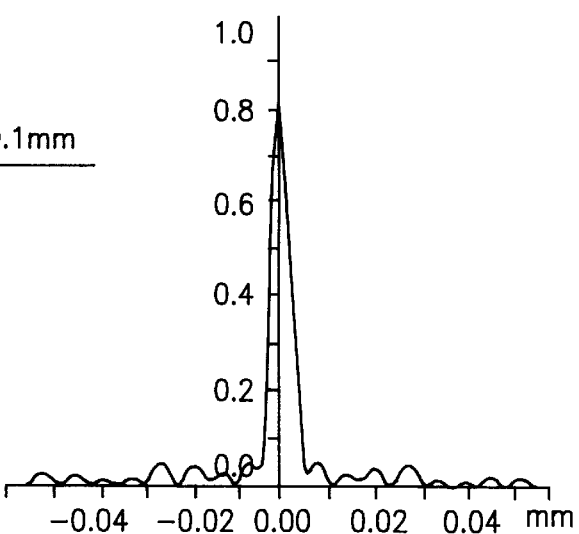
Figure 8C:
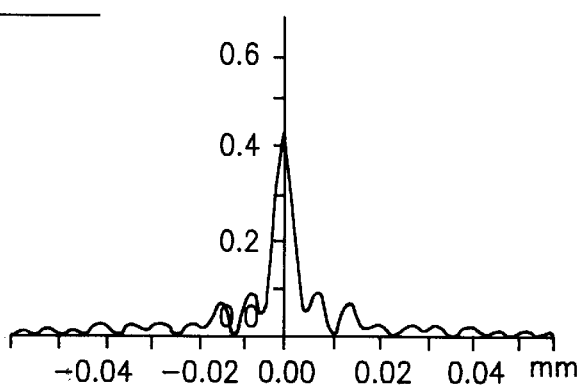

FIG. 8A, FIG. 8B or FIG. 8C shows a beam intensity distribution when the defocus amount is 0 mm, 0.1 mm or 0.2 mm, respectively. As in FIG. 4A to FIG. 7C, the horizontal axis represents a distance r to the optical axis and the vertical axis an intensity normalized so that the center peak intensity is 1 when the defocus is 0.

FIG. 8A shows an example in which there is no defocus of a double Bessel beam decreased in diffraction ring intensity, that is, a case of z=0, which is identical to the case with $\epsilon=0.5$ in FIG. 6. This is set as a reference state for FIGS. 8A to 8C and FIGS. 9A to 9C. If a diameter of a spot is defined at $1/e^2$ of the center intensity in the same manner as in normal Gaussian beam, the diameter is 8.4 $\mu$m. If the defocus is 0.1 mm as shown in FIG. 8B, the center peak intensity decreases to about 80%, and if the defocus is 0.2 mm as shown in FIG. 8C, the center peak intensity decreases to about 40%.

As shown in the calculation results of FIGS. 8A to 8C, the double Bessel beam decreased in diffraction ring intensity does not own the property of ultra deep depth of focus as the conventional Bessel beams have. Observing the absolute value, the double Bessel beam, however, has a depth of focus which is about double of that of a Gaussian beam having the same spot diameter, or which is about 1.2 times deeper than that of an Airy pattern.

Figure 9A:
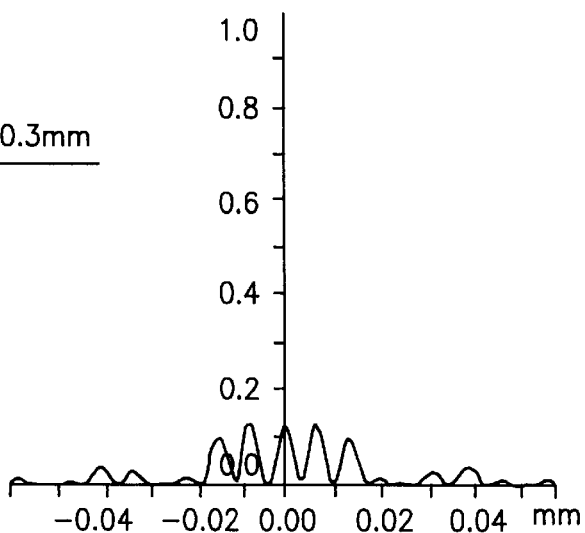
FIGS. 9A to 9C are drawings to show the defocus dependency of a double Bessel beam.
Figure 9B:
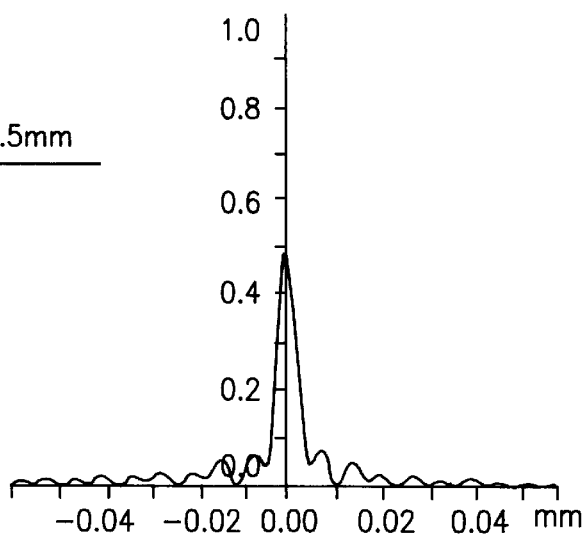
Figure 9C:
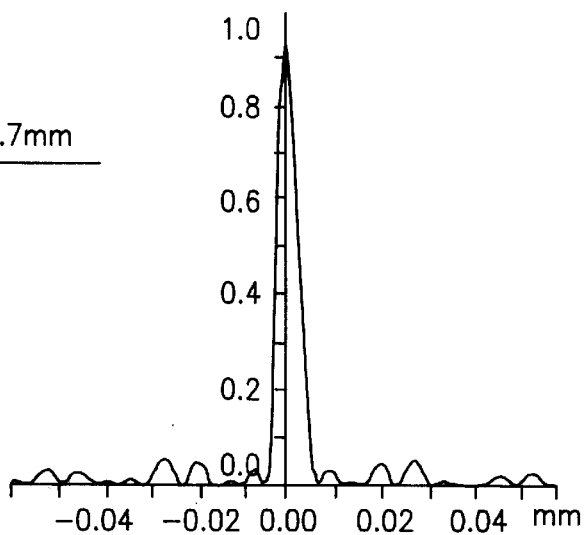

In addition, the double Bessel beam has the characteristic defocus property. FIGS. 9A to 9C show the defocus property, that is, the beam intensity distribution when the defocus amount is further increased, or when the defocus amount z becomes 0.3 mm, 0.5 mm or 0.7 mm.

When the defocus amount is 0.3 mm as shown in FIG. 9A, the central intensity becomes lower than that in the case of 0.2 mm, so that the center peak intensity becomes about 14% of that in the reference state. However, when the defocus amount becomes 0.5 mm as shown in FIG. 9B, the intensity turns to increase, so that the center peak becomes about 50%. If the defocus is 0.7 mm as shown in FIG. 9C, the beam amplitude distribution shape further changes to have almost the same intensity distribution as the reference state (as in the case of z=0 mm).

Equation (12) illustrates the recovery phenomenon of beam amplitude distribution shape as shown in FIGS. 9A to 9C. In Equation (12) a changing factor with change in defocus z is an exponent to the exponential in the first term. Since the exponential term has the form of exp(i·p·z), the amplitude changes in the periodic manner with change of defocus amount z. In particular, the term is linear for z, so that the value inside the parentheses in the exponential term takes the same value at each z of constant pitch. Thus, the intensity distribution shows the same value at each z. In other words, the same intensity distribution repeatedly appears at a constant pitch or at each constant defocus amount.

The phenomenon of repetitive appearance of the same pattern in the direction of optical axis is similar to the phenomenon called as Fourier images, in which grating images appear at constant pitch when a diffraction grating is illuminated by monochromatic light. As the Fourier images are explained as mutual interference phenomenon occurring while a plurality of clearly separate diffraction beams propagate, the defocus property of double Bessel beam of the present invention may also be explained as an interference phenomenon of two Bessel beams. In other words, the defocus property of double Bessel beam can be deemed as Fourier images of fine spots.

From Equation (12), a pitch zp of Fourier images of double Bessel beam can be obtained by solving the following equation.

$$k(1-\epsilon^2)zp/8F^2 = 2\pi \qquad (14)$$

The obtained pitch is as follows.

$$zp = 8\lambda F^2/(1-\epsilon^2) \qquad (15)$$

Substituting $\lambda$=632.8 nm, F=10 and $\epsilon$=0.5, which are the conditions in calculation in FIGS. 8A to 8C and FIGS. 9A to 9C, into Equation (15), zp=0.675 mm. The recovery of beam amplitude distribution shape at the defocus of 0.7 mm in FIG. 9C is coincident with this calculation result.

The basic property of a double Bessel beam was described using the optical system of FIG. 2, but the double Bessel beam can be formed by another method.

Figure 10A:
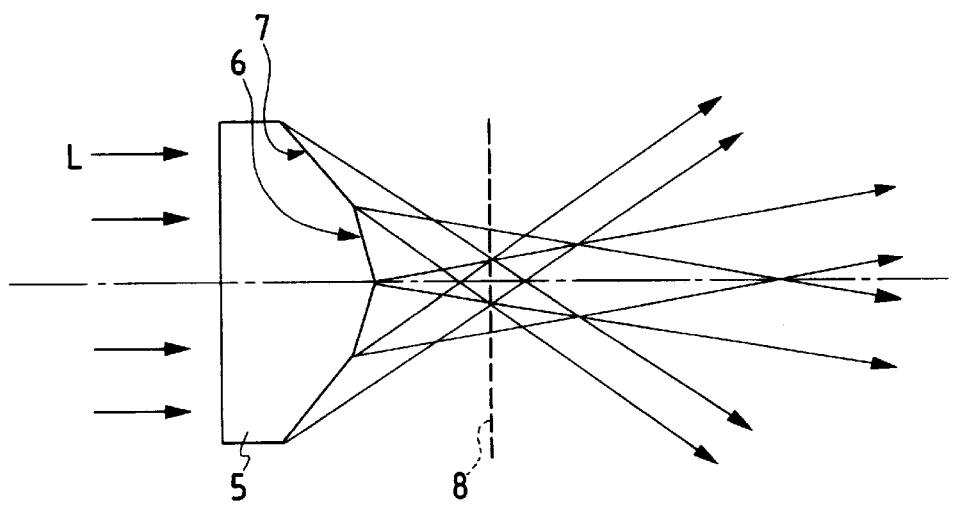
FIGS. 10A to 10B are drawings to show an optical system using a double conical prism in the second embodiment of the present invention.
Figure 10B:
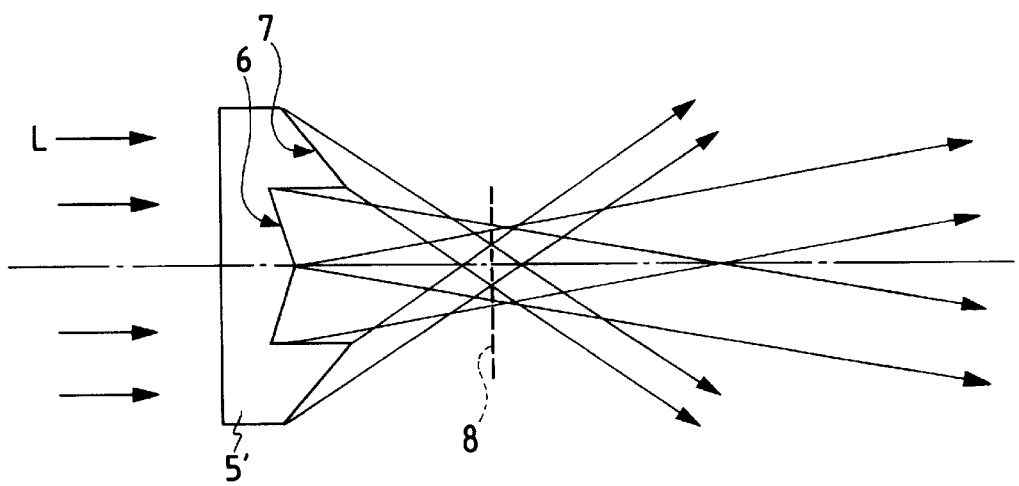

FIG. 10A or FIG. 10B shows an example of another method. FIG. 10A shows an example using a double conical prism 5. The method for producing the double Bessel beam by using the prism has an advantage of higher utilization efficiency of light than the method of FIG. 2. The prism 5 has a surface composed of a conical plane 6 having a first apical angle, a conical plane 7 having a second apical angle different from the first apical angle, and a flat plane opposite to the two conical planes. Incident into the flat plane of the double conical prism 5 is laser light L as emitted from an unrepresented laser source and collimated thereafter.

A part of laser light L passing through the prism 5 goes out of the conical plane 6 having the first apical angle, and the rest goes out of the conical plane 7 having the second apical angle. A double Bessel beam of the present invention is formed by setting an observation surface 8 in the region where the laser beams outgoing from the respective conical planes cross each other.

FIG. 10A shows a constitutional example in which there is no step at the border between the conical plane 6 having the first apical angle and the conical plane 7 having the second apical angle, while FIG. 10B shows another possible example in which a double conical prism 5' having a step at the border is used. Also in the latter case, the two beams outgoing from the two conical planes can produce a double Bessel beam by the mutual interference in the region 8 where the two beams cross each other.

Figure 11:
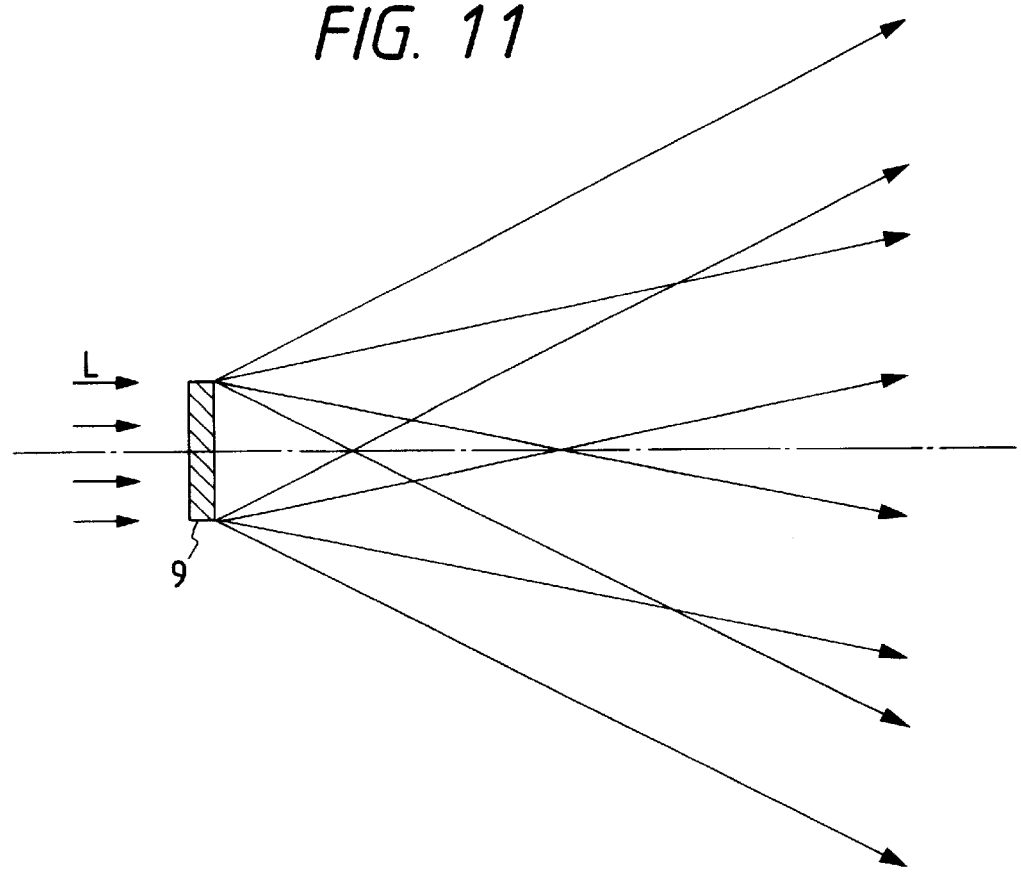
FIG. 11 is a drawing to show an optical system using an amplitude phase filter in the third embodiment of the present invention.

FIG. 11 shows an embodiment for producing a double Bessel beam by using a physical-optic element. In FIG. 11, reference numeral 9 denotes an amplitude type phase filter, a transmission function F(r) of which is given by the following equation.

$$F(r) = \epsilon \exp[ik(1-\epsilon^2)z0/8F^2] J_0(\epsilon\pi r/\lambda F) + J_0(\pi r/\lambda F) \qquad (16)$$

Setting z0=0 to simplify Equation (16), the following equation is obtained, which is coincident with Equation (9).

$$F(r) = \epsilon \cdot J_0(\epsilon\pi r/\lambda F) + J_0(\pi r/\lambda F) \qquad (17)$$

In Equation (17) r represents a distance to the optical axis and $\epsilon$, F and z0 are constants.

If the amplitude is 1 for collimated laser beams L entering the amplitude type phase filter 9 having a function to change both the amplitude and the phase, an amplitude distribution right after the exit from the filter 9 is just as expressed by Equation (16) or Equation (17), forming a double Bessel beam. The filter 9 shown in FIG. 11 is thinner in the direction of optical axis than the optical system of FIG. 2 or the double conical prism of FIG. 10A or FIG. 10B, and is a single element without need of additional elements, which is the most compact double Bessel beam producing element.

Figure 12:
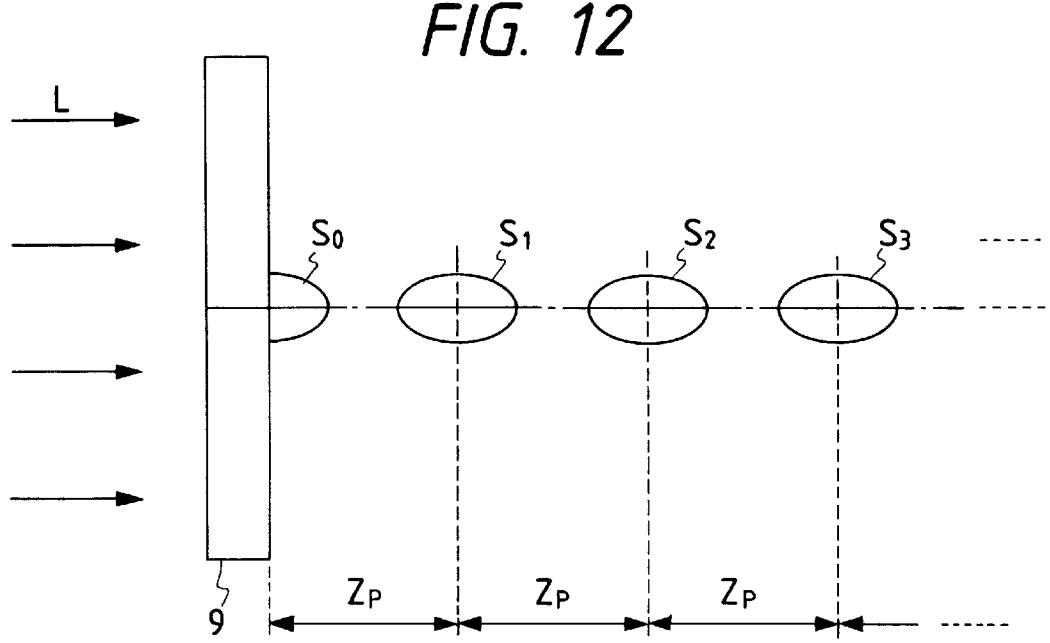
FIG. 12 is a drawing to show Fourier images produced by the amplitude phase filter.

FIG. 12 shows how the double Bessel beam is produced by the amplitude phase filter 9 having the transmission function of Equation (17), in which Fourier images of micro spots are emphasized. The parameter $\epsilon$ is set to a value near 0.5.

In FIG. 12, L represents a beam of parallel rays from laser source, 9 an amplitude type phase filter, and S0, S1, S2, S3, . . . are micro spots formed at positions where distances from the exit plane of amplitude type phase filter 9 are 0, zp, 2zp, 3zp, . . . , respectively. As shown, micro spots are aligned at equal intervals along the optical axis by the principle of Fourier images. The value of zp is given by Equation (15). Similar micro spots are formed at each zp in the method using the optical system shown in FIG. 2 or in FIG. 10 instead of the filter 9, but the region where the micro spots are formed is limited to the region where the two beams are superimposed.

Figure 13:
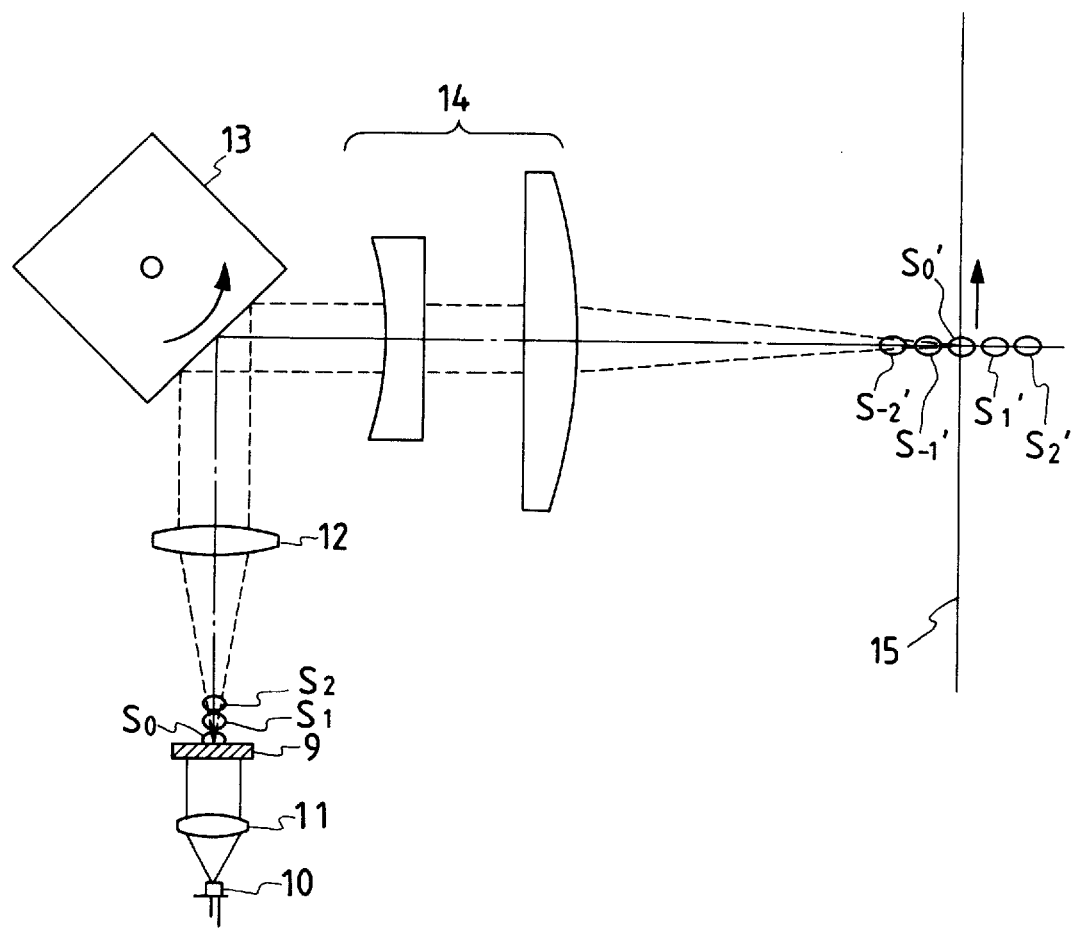
FIG. 13 is a drawing to show an embodiment in which a double Bessel beam of the present invention is applied in an optical scanning apparatus.

The double Bessel beam may be produced in the simple manner as described above. Further, the double Bessel beam decreases the unnecessary interference pattern, which was seen in the conventional Bessel beam. In addition, the double Bessel beam has a deeper depth of focus than the Gaussian beams. Therefore, the double Bessel beam can have applications in a variety of fields. FIG. 13 shows an example of application, in which the double Bessel beam is applied in an optical scanning apparatus.

In FIG. 13, reference numeral 10 designates a semiconductor laser of light source, 11 a collimating lens, 9 an amplitude type phase filter for producing a double Bessel beam, 12 a lens with front focal plane thereof coincident with an exit plane of filter 9, 13 a rotating polygon mirror, 14 an fθ lens, and 15 a surface to be scanned. Further, S0, S1, S2, . . . represent Fourier images of micro spots formed in the vicinity of the amplitude type phase filter 9 and . . . , S-2', S-1', S0', S1', S2', . . . Fourier images of micro spots formed in the vicinity of the surface to be scanned 15, which are emphasized.

A laser beam emitted from the semiconductor laser 10 is collimated into a beam of parallel rays by the collimating lens 11, and the collimated beam enters the amplitude type phase filter 9. The amplitude type phase filter 9 is as shown in FIG. 12, and the outgoing beam is a double Bessel beam to form Fourier images of micro spots S0, S1, S2, . . . in the vicinity of the filter 9. Now, let us look at a spot S0, which determines the basic amount of optical system. A diverging beam from S0 is converted into parallel beam by the lens 12, and the beam is then reflected and thus deflected by a mirror reflective surface of the rotating polygon mirror 13 disposed in the vicinity of the rear focal plane of lens 12. The reflected beam passes through the fθ lens 14 and then forms a beam spot S0' on the surface to be scanned 15.

The spot S0' scans the surface to be scanned with rotation of the rotating polygon mirror 13. Other spots S1, S2, . . . also pass through respective optical paths similar to that of spot S0 to form spots S1', S2', . . . at respective positions defocused from the surface to be scanned 15. Micro spots S-1, S-2, . . . are formed as virtual images in front of the amplitude type phase filter 9, and pass through respective optical paths similar to that of spot S0 to form spots S-1', S-2', . . . at respective positions defocused from the surface to be scanned 15. The spots . . . , S-2', S-1', S0', S1', S2', . . . are formed on a straight line along the propagation direction of beam on or near the surface to be scanned 15, and scan with rotation of the rotating polygon mirror 13.

The formation of series spots is very advantageous in assembly adjustment of optical system. Although the spot S0' is just on the surface to be scanned in the arrangement shown in FIG. 13, the spot S0' is not always coincident with the surface to be scanned 15, but could be deviated in the direction of optical axis because of errors in radius of curvature of lens, in interplanar spacing between optical elements, in index of refraction, etc. even if an apparatus is actually assembled as designed. In order to absorb such variations, the conventional systems for forming a single spot such as a Gaussian beam spot and an Airy pattern spot must be adjusted to form an image of spot on the surface to be scanned 15 by greatly changing the distance between lenses or the position of object plane or image plane.

The optical scanning apparatus employing the double Bessel beam of the present invention as shown in FIG. 13, however, has multiple imaging points of spots along the propagation direction of beam, and therefore does not require complex adjustment. If spot S2' is located in the vicinity of the surface to be scanned 15 for example, S2' may be used as a scanning spot by placing S2' at the position of 15 instead of spot S0'. As described, the use of double Bessel beam greatly simplifies the assembly adjustment of optical system.

As detailed above, the double Bessel beam can be attained by a simple optical system and can achieve the effect including the advantages of the conventional beam systems in relation between the spot shape and the depth of focus. As compared with the Bessel beams, the double Bessel beam can provide a scanning spot reduced in diffraction rings (side lobes), whereby a higher quality output pattern may be obtained. When it is compared with the Gaussian beams or the Airy patterns, it can provide a scanning beam spot deeper in depth of focus, whereby it is advantageous in the system arrangement of an entire apparatus or in error allocation in designing. As a third advantage, the Fourier images can be utilized, so that the assembly adjustment of optical system may be made easier.

As described above, the double Bessel beam has the beam shape easy in handling and a deep depth of focus, so that it can be applied widely in various optical apparatus, for example in optical scanning apparatus, in optical memory apparatus, etc.

What is claimed is:

1. A method for producing a double Bessel beam, comprising superimposing two beams on each other with respect to amplitude so as to interfere with each other and to produce a double Bessel beam wherein the amplitudes of side lobes are smaller than the amplitudes of side lobes of either of the two beams, each of the two beams having an amplitude distribution in the shape of the zero-order Bessel function of the first kind and a beam diameter different from that of the other, wherein a ratio $\epsilon$ of the diameters of the two beams is determined to satisfy the relation of $0.3 \leq \epsilon \leq 0.7$.

2. A method according to claim 1, wherein the amplitude of the double Bessel beam is given by a sum of amplitudes of the two beams having different diameters.

3. An apparatus for producing a double Bessel beam, comprising:

means for producing two beams each having an amplitude distribution in the shape of a zero-order Bessel function of the first kind and a beam diameter different from the other; and means for superimposing the two beams on each other with respect to amplitude so as to interfere with each other and to produce a double Bessel beam wherein the amplitudes of side lobes are smaller than the amplitudes of side lobes of either of the two beams, wherein a ratio $\epsilon$ of the diameters of the two beams is determined to satisfy the relation of $0.3 \leq \epsilon \leq 0.7$.

4. An apparatus according to claim 3, wherein the amplitude of the double Bessel beam is given by a sum of amplitudes of the two beams having different diameters.

5. An apparatus according to claim 3, wherein said means for producing two beams comprises a double ring aperture.

6. An apparatus according to claim 3, wherein said means for producing two beams comprises a double conical prism.

* * * * *

UNITED STATES PATENT AND TRADEMARK OFFICE
CERTIFICATE OF CORRECTION

PATENT NO. : 6,016,223

DATED : January 18, 2000

INVENTOR(S) : Masayuki SUZUKI, et al.

It is certified that error appears in the above-identified patent and that said Letters Patent is hereby corrected as shown below:

ON THE COVER PAGE:

AT [57] Abstract:

Line 4, "bessel" should read --Bessel--.

COLUMN 1:

Line 5, "08/11,867" should read --08/111,867--.

COLUMN 3:

Line 21, "as" should read --so as--.

COLUMN 4:

Line 26, "r)" should read --r/f)--.
Line 51, "B2" should be deleted.

COLUMN 6:

Line 67, "as" should be deleted.

UNITED STATES PATENT AND TRADEMARK OFFICE
CERTIFICATE OF CORRECTION

PATENT NO. : 6,016,223

DATED : January 18, 2000

INVENTOR(S) : Masayuki SUZUKI, et al.

Page 2 of 2

It is certified that error appears in the above-identified patent and that said Letters Patent is hereby corrected as shown below:

COLUMN 7:

Line 60, "$F(r)=\epsilon\exp[ik(1-^2)$" should read
--$F(r)=\epsilon\cdot\exp[ik(1-\epsilon^2)$--.

Signed and Sealed this

Twenty-fourth Day of April, 2001

Attest:

NICHOLAS P. GODICI

Attesting Officer

Acting Director of the United States Patent and Trademark Office